(12) United States Patent
Lee

(10) Patent No.: US 6,219,475 B1
(45) Date of Patent: Apr. 17, 2001

(54) NONDESTRUCTIVE MEASUREMENT METHOD OF INDIVIDUAL MODE LOSS FOR WAVEGUIDES

(75) Inventor: Ching-Ting Lee, Chung-Li (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/293,888

(22) Filed: Apr. 19, 1999

(51) Int. Cl.$^7$ ......................................................... G02B 6/26
(52) U.S. Cl. .................................................. 385/31; 385/36
(58) Field of Search ......................... 385/31, 36, 12, 385/14, 2, 3, 129, 142

(56) References Cited

PUBLICATIONS

I. P. Kaminow et al, Appl. Phys. Lett. 33(1), "Loss in cleaved Ti–diffused . . . ", pp. 62–64, Jul. 1, 1978.
H. P. Weber et al, Applied Optics, vol. 12, No. 4, "Loss Measurements in Thin–Film . . . ", pp. 755–757, Apr. 1973.
Lih–Gen Sheu et al, Optical Review, vol. 3, No. 3, "Nondestructive Measurement of Loss . . . ", pp. 191–196, 1996.
Ching–Ting Lee, Applied Physics Letters, vol. 73, No. 2, "Nondestructive measurement of . . . ", pp. 133–135, Jul. 13, 1998.
J. E. Goell et al, Bell System Tech. Journal, "Sputtered Glass Waveguide for Integrated . . . ", pp. 3445–3448, Sep. 16, 1969.

*Primary Examiner*—Phan T. H. Palmer
(74) *Attorney, Agent, or Firm*—Jacobson, Price, Holman & Stern, PLLC

(57) ABSTRACT

The device concerns measuring the propagation and bending losses that take place in the individual mode of the multi-mode waveguide. The method applied is a new one comprising butt-couple and prism-couple together with phase-modulation method. Electrodes are made on the waveguide, and applied with voltage. The electro-optical effect is used to modulate the effective length of the waveguide in forming a Fabry-Perot etalon. From here, the contrast of the butt-couple's output and the loss can be measured. At the same time, as the prism-couple is able to separate the multiple modes individually, and measure the contrast and loss of each mode through every output mode which are then compared with the butt-couple, each mode's propagation and bending losses values of the multi-mode waveguide can be derived.

10 Claims, 5 Drawing Sheets

NONDESTRUCTIVE MEASUREMENT METHOD OF INDIVIDUAL MODE LOSS FOR WAVEGUIDES

BACKGROUND OF THE INVENTION

1. Field of the Invention

The present invention demonstrates the method applied is a new one comprising butt-couple and prism-couple together with phase-modulation method.

For the integrated optical-components, such as modulator, directional coupler, switcher, and wave-length division multiplexer, the basic structure is a waveguide. Consequently, the characteristics of waveguides remain an important area of study for the integrated optical-components. Among which, the most critical one is the propagation loss. The reason being that the value can be used for improving the manufacturing process of integrated optical-components as well as evaluate their functions.

2. Description of the Prior Art

As of present, the customary technologies in practice for measuring the propagation loss are only applicable to single mode waveguide. Besides, such technologies are only able to measures the total propagation loss of multi-mode waveguide, and not capable of distinguishing the individual propagation loss of every individual mode for a multi-mode waveguide. Moreover, among the integrated optical-components built by waveguides, bending waveguide is a rather common structure. The customary technologies are only able to measure the bending loss of a single-mode waveguide, and total bending loss of a multi-mode waveguide. It is not capable of distinguishing the individual bending loss of every individual mode for a multi-mode waveguide. However, for multi-mode waveguide, the propagation loss and bending loss serve not only the evaluation function for improvement of manufacturing process, they are of considerable use in enhancing the designs of optical-components. They can also be applied in obtaining further understanding of multi-mode waveguide's individual mode function and physical behaviors.

Presently, the customary technologies used for measuring waveguide propagation loss include the following:

1.) Cut-back method as shown in FIG. 1 (I. P. Karminow & L. W Stulz, Loss in cleaved Ti-diffused LiNbO$_3$ waveguides, *Appl. Phys. Lett.* 33, P. 62, 1978).

When the length of a waveguide is L$_1$, the light is coupled into the edge of waveguide 1 through lens 2; the output light of the another edge of waveguide 1 is projected into optical-detector 4 through output Lens 3 for measuring optical intensity P$_1$. The length of Waveguide 1 is then cleaved into a length of L$_2$, and the light is projected into through the edge. The optical intensity measured is P$_2$, and the propagation loss α is as follows:

$$\alpha = \left|10 \log\left(\frac{P_1}{P_2}\right)/(L_1 - L_2)\right| \text{ dB/cm} \quad (1)$$

The disadvantage of this method is that, in addition to the destructive detection through cleaving waveguide, when couple light is introduced into the waveguide, the coupling efficacy each time must be the same, which is very difficult.

2.) Prism-Sliding Method as shown in FIG. 2 (H. P. Weber, F. A. Dunn & W. N. Leibolt, Loss measurements in thin film optical waveguide, *Appl. Opt.* 12, 755, 1973)

This method uses prism coupling method to couple light into Waveguide 1 through Prism 5, and the light comes out through Prism 6. Move the position of Prism 6; then use Optical Detector 4 to measure the outs of optical power of Prism 6 put at different positions. The values are compared to derive the waveguide's propagation loss. The drawback of this method is that coupling efficacy between prism and waveguide must be the same for different prism positions which is also exceedingly difficult.

3.) Scattering-Detection Method as shown in FIG. 3 (J. E. Goell & R. D. Standley, Sputtered glass waveguide for integrated optical circuits, Bell Syst, *Tech, J.* 48, 3445, 1969)

With this method, Input Prism 5 is used to couple light to Waveguide 1, using Optic-Fibre 7 to capture the scattered light intensity of Waveguide 1 at different positions. Optic-Detector 4 is then used to measure the scattered optical power at different positions in deriving the propagation loss of waveguide. The drawback of this method is that it is only capable of measuring waveguides that scattered large optical power which must be avoided in integrated optical components.

4.) Phase-Modulation Method as shown in FIG. 4 (L. G. Shen, C. T. Lee, H. C. Lee, Non-destructive measurement of loss performance in channel waveguide devices with phase modulator, *Opt. Rev.* 3, 192, 1996)

This method is created by the applicant. Light is coupled at the edge of Waveguide 1 through Input Lens 2. Voltage is then applied to the phase modulator built by Electrode 8 for controlling the effective length of Waveguide 1 in forming Fabry-Perot etalon. Optic-Detector 4 is used for measuring, and osilloscope 9 shows the measured oscillation results for deriving it's associated contrast C, which is defined as C=(Imax−Imin)/(Imax+Imin). In which, Imax and Imin are the maximum and minimum values of the measured oscillation results. From the contrast value, the propagation loss α of Waveguide 1, when the length is L, is given by $$\alpha = \frac{4.34}{L}\left\{\ln R - \ln\left[\left(1 - \sqrt{1-c^2}\right)/C\right]\right\} \text{ dB/cm} \quad (2)$$

In which, R is the reflection coefficient at waveguide edge.

SUMMARY OF THE INVENTION

The object of the invention is not merely for measuring the propagation and bending losses of single-mode waveguides; it is extended to measuring the individual modes' propagation and bending losses of multi-mode waveguides. The measuring method under claim applies the combination of prism-coupler, butt-coupler and phase modulation method.

BRIEF DESCRIPTION OF THE DRAWINGS

Table 1 Edge Coupled Results
Table 2 Prism Coupled Results
Table 3 Mode Bending Loss
FIG. 1 illustrated Cut-back method.

FIG. 8(a) no Prism is put on the Waveguide;

FIG. 8(b) Prism is put on the waveguide;

FIG. 8(c) light intensity of the TM1 mode coupled through Prism; and

DETAILED DESCRIPTION OF THE INVENTION

The customary technologies applied in measuring waveguide propagation and bending losses are limited to single-mode waveguides. When used in measuring multi-mode waveguides, they are only able to measure the total propagation and bending losses of the multiple modes. The object of the invention is to provide a measurement method which is not only able to the propagation and bending losses of single-mode waveguides, it is also able to derive the propagation and bending losses of the individual modes of multi-mode waveguides. The new method combines prism-couple, butt-couple and phase-modulation method in creating an advance and novel measurement method. Moreover, this method is of practical field value to the manufacturing process of waveguides and achieving optimal performances of integrated optical components. To better explain the performance and features of the new method, two examples are cited. Example 1 is used to describe the method for measuring waveguide's propagation loss, and Example 2 for the bending loss.

EXAMPLE 1

Figure 1:
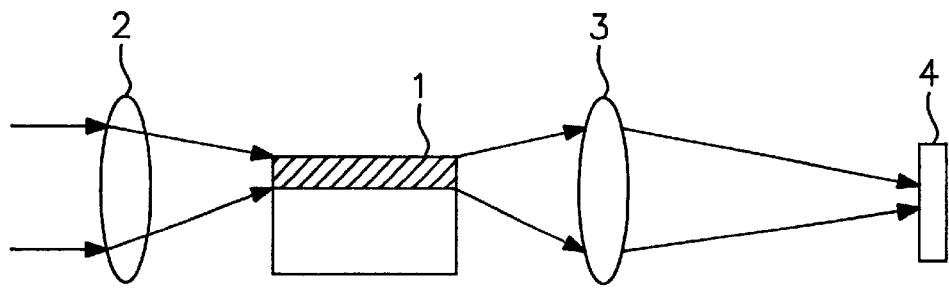
Figure 2:
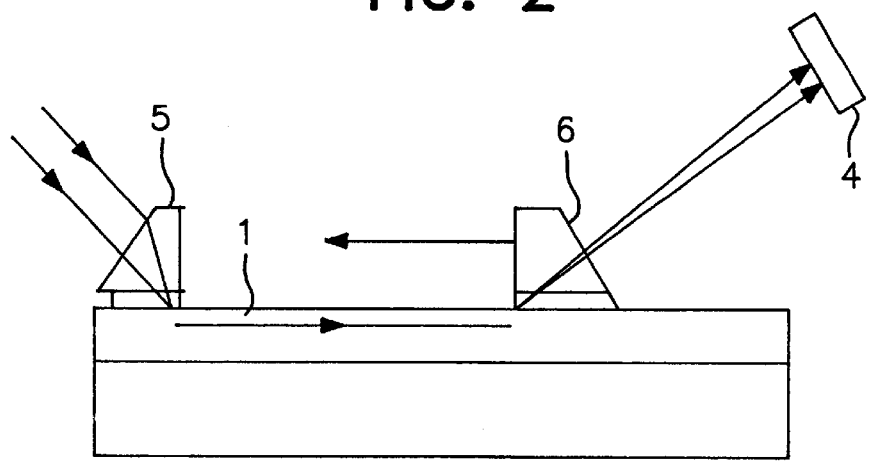
FIG. 2 Prism-Sliding Method.
Figure 3:
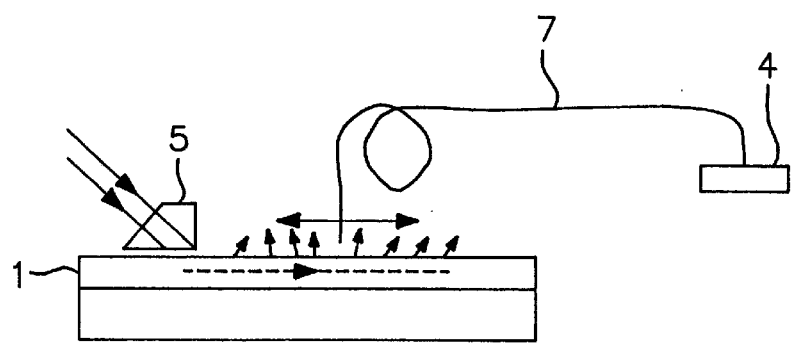
FIG. 3 Scattering-Detection Method.
Figure 4:
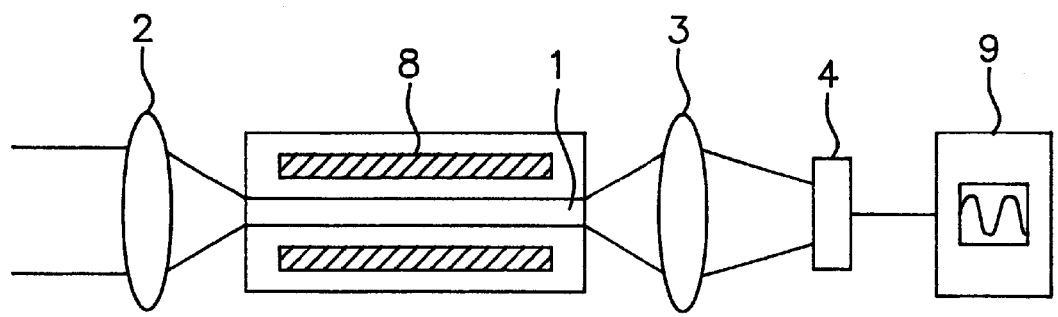
FIG. 4 Phase-Modulation Method.
Figure 5:
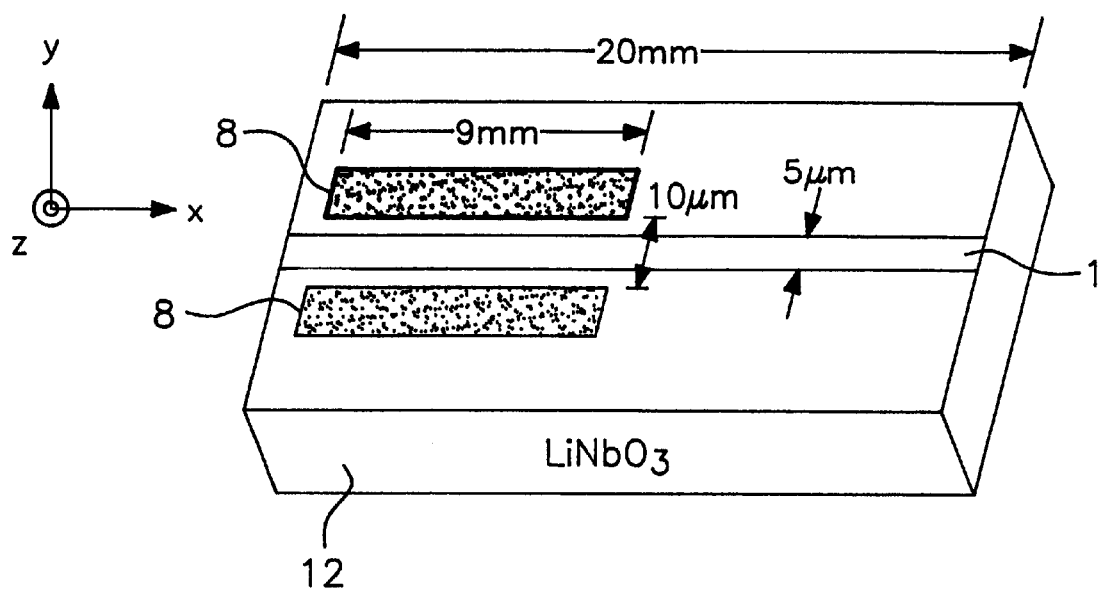
FIG. 5 measuring method for waveguide's propagation loss.

As shown in FIG. 5, long straight Waveguide 1 is fabricated first. The fabrication processes include using thermal diffusion method, ion exchanges thin film deposition and ion implantation method to produce on such substrates as $LiNbO_3$ and $LiTaO_3$, or on the organic layer coated onto glass or other insulating materials, or use the various structures of semiconductor material to fabricate ridge or buried channel waveguides or planar waveguides. Gold, aluminum or other conductive metals are then used to produce Electrode 8. When voltage is applied to the electrode, electric-optic effects can be used to change the waveguide's effective refractive index that subsequently alters the effective length of the waveguide. This enables waveguide to form Fabry-Perot etalon. When light is coupled into waveguide 1 through the input edge, optical detector is used to measure that output light coupled through the output edge. In addition, when an oscilloscope is also used to display the output result measured from optical detector maximum $I_{max}$ and minimum values $I_{min}$ can be taken from the oscilloscope. With these two values, contrast C can be obtained as follows:

$$C = (I_{max} - I_{min})/(I_{max} + I_{min}) \quad (3)$$

According to the basic theory of Fabry-Perot etalon, it can be derived that when waveguide length is L, and the edge reflection coefficient is R, the relation between the propagation loss $\alpha_{cw}$ and contrast C can be expressed as follows:

$$\alpha_{ew} = \frac{4.34}{L}\{\ln R - \ln[(1-\sqrt{1-c^2})/C]\} \text{ dB/cm} \quad (4)$$

Figure 7:
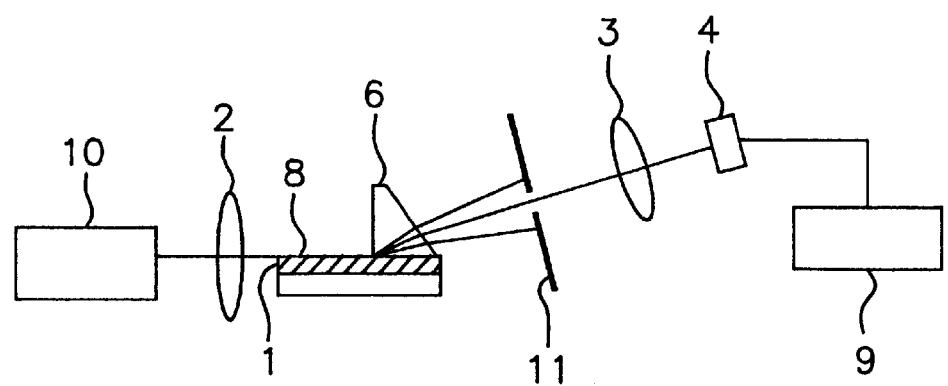
FIG. 7 measuring method for waveguide's propagation loss, when prism is coupled on the waveguide.

Thus, phase-modulation method is able to calculate the propagation loss of the waveguide through the contrast C value measured. Similarly, when prism is coupled to the waveguide as shown in FIG. 7, following the aforementioned method, the corresponding contrast value can be used to derive the total propagation loss $\alpha_{ep}$ created when prism couples can be obtained, including prism-couple light output and waveguide propagation loss. Therefore, when no prism is coupled on the waveguide, the light intensity $I_{ow}$ coupled at the output edge is as follows:

$$I_{ow} = I_i \exp(-\alpha_{ew}L) \quad (5)$$

When prism is coupled on the waveguide, the light intensity $I_{op}$ coupled at the output edge is as follows:

$$I_{op} = I_i \exp(-\alpha_{ep}L) \quad (6)$$

In which $I_i$ is the total input intensity coupled into the waveguide at the input edge. When the waveguide has total n modes, and the light intensity of the mth mode is $I_{im}$, it can be expressed as follows:

$$I_i = \sum_{m=1}^{n} I_{im} \quad (7)$$

When either prism is coupled or not coupled into the waveguide, the light intensity difference coupled at the output edge is the light intensity $I_{pl}$ coupled out from Prism 6; consequently the following can be derived:

$$I_{pl} = I_{ow} - I_{op} = I_i - \exp(-\alpha_{ew}L) - \exp(-\alpha_{ep}L) = \eta I_i \quad (8)$$

In which, $\eta = \exp(-\alpha_{ew}L) - \exp(\alpha_{ep}L)$. When the waveguide is a multi-mode one with total n modes, and assuming that the light intensity of the mth mode is $I_{plm}$, it can be expressed as $$I_{pl} = \sum_{m=1}^{n} I_{plm} = \eta I_i \quad (9)$$

Figure 6:
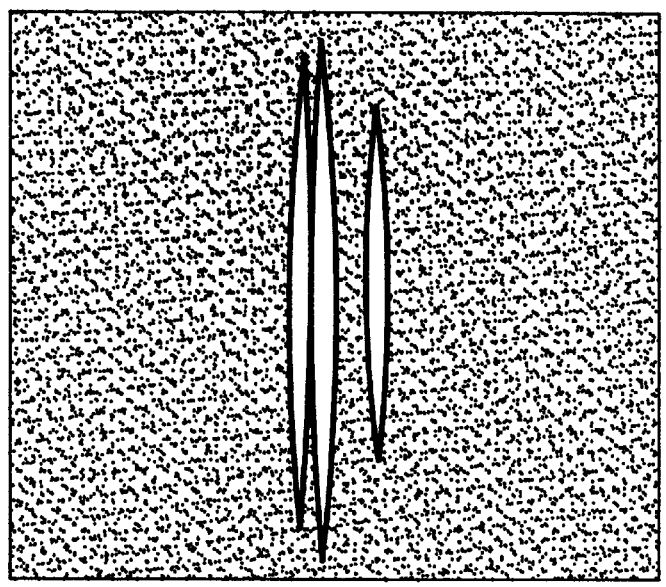
FIG. 6 measuring method for bending loss.

As the propagation constants of different modes vary, the various modes coupled by prism may be separated as shown in FIG. 6. When the experimental measurement method as shown in FIG. 7 is applied: using Input Lens 2 to couple the light produced by Optical Source 10 into Waveguide 1; then couple out by Lens 6. Use iris 11 to pass only one required mode of the modes, and block all the other modes, the above method can be used to measure the contrast of each mode coupled by prism separately. Thus, enabling calculation of their propagation losses. For the mth mode, the corresponding propagation loss is $\alpha_{plm}$.

For the mth mode of the multi-mode waveguide, when there is no prism coupler on the waveguide, assuming that the light intensity coupled by the edge is $I_{owm}$, the corresponding propagation loss is $\alpha_{ewm}$. When there is a prism coupler on the waveguide and that the edge coupled intensity is $I_{opm}$ (corresponding propagation loss is $\alpha_{epm}$) and prism coupled intensity is $I_{plm}$ (corresponding propagation loss is $\alpha_{plm}$), the following equation can be derived:

$$I_{owm} = I_{im}\exp(-\alpha_{ewm}L) = I_{opm} + I_{plm} = I_{im}\exp(-\alpha_{epm}L) + I_{plm} \quad (10)$$

Assuming that the prism couple efficacy of each individual mode is the same, and assigned as η, equation (9) can be rewritten as:

$$I_{pl} = \eta I_i = \sum_{m=1}^{n} \eta I_{im} = \sum_{m=1}^{n} I_{plm} \quad (11)$$

Consequently from Equations (5), (6), (10) and (11), the following equation can be derived:

$$\exp(-\alpha_{ewm}L) = \exp(-\alpha_{epm}L) + [\exp(-\alpha_{ew}L) - \exp(-\alpha_{ep}L)] \quad (12)$$

Following the method mentioned above, bring the $\alpha_{epm}$, $\alpha_{ew}$, and $\alpha_{ep}$ into Equation (12), to derive the propagation loss $\alpha_{ewm}$ of the mth mode.

An example is cited below to illustrate:

Use ion exchange method to fabricated a long straight waveguide on Z-cut LiNbO$_3$ substrate as shown in FIG. 5. Evaporate 200 mm thickness of SiO$_2$ on the substrate, and open a window with width of 5 μm for the waveguide pattern. Immerse in Benzoic acid at 215° C. for 30 minutes, then use Hydrofluoride acid to remove the SiO$_2$ layer. Put in a furnace with oxygen at 350° C. for 6 hours before using conventional photolithography technique to produce Gold Electrode 8 on the two sides of the long straight Waveguide 1 as a phase-modulator. The TM mode coupled by prism is as shown in FIG. 6, endowed with TM1, TM2 and TM3 modes. The corresponding effective regraction index is Neff=2.2086, 2.2051 and 2.2029 respectively. Consequently, the reflection coefficient can be obtained from R=[(N$_{eff}$-1)/(N$_{eff}$+1)]$^2$.

Figure 8A:
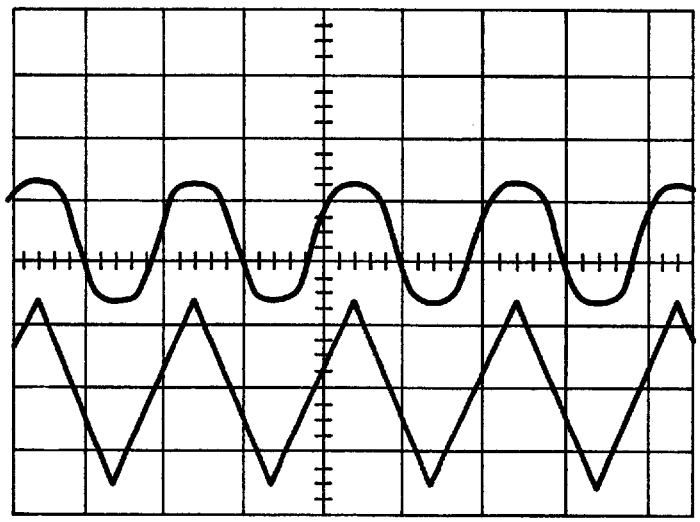
FIGS. 8(a)–(c) illustrated the results shown on oscilloscope.
Figure 8B:
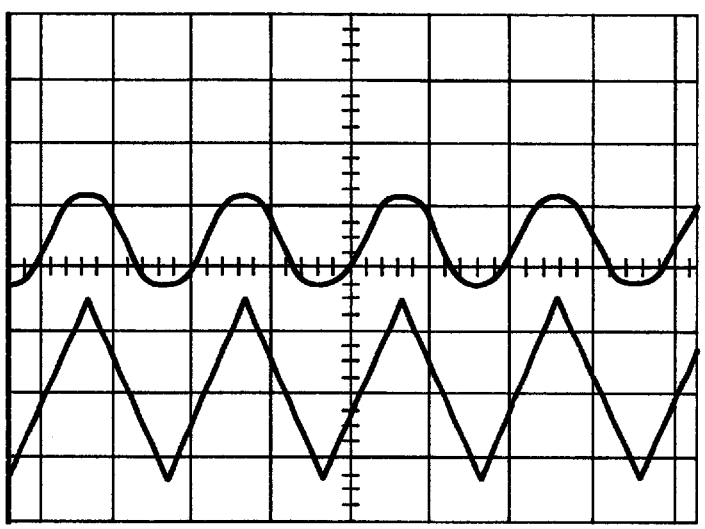
Figure 8C:
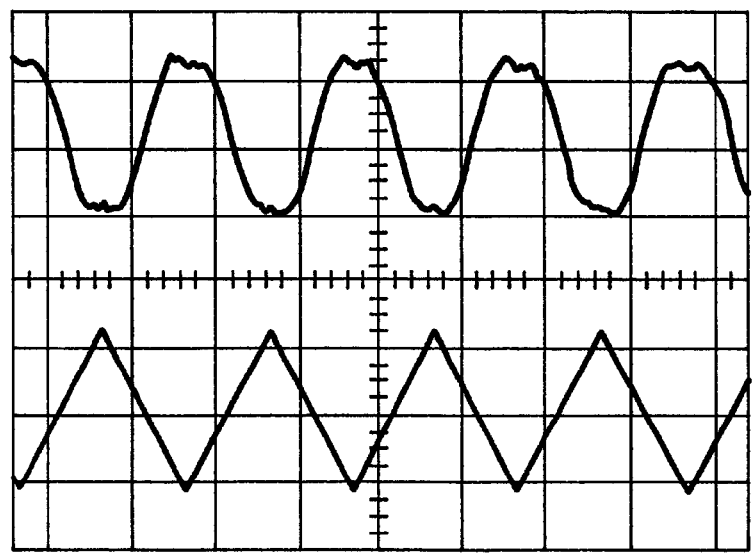

The experimental method as shown in FIG. 7, can be used to measure the light intensity butt coupled through the output of the waveguide edge when no Prism is put on the Waveguide 1. The results shown on oscilloscope are as illustrated in FIG. 8(*a*). In FIG. 8(*a*), the lower curve is the modulation voltage signal; the vertical coordinate is 10 volt/div., and 100 msec/div. The upper curve shows the output intensity measured; the vertical coordinate is 100 uvolt/div., and 100 msec/div. Those with light butt coupled out through the edge of the Waveguide 1 when Prism 6 is put on the waveguide, is illustrated on the Osciloscope 9 as shown in FIG. 8(*b*). In FIG. 8(*b*), the lower curve is the modulation voltage shows; the vertical coordinate is 10 volt/div., and 100 msec/div. The upper curve shows the output intensity measured; the vertical coordinate is 100 μvolt/div., and 100 msec/div. The light intensity of the TM1 mode coupled through Prism 6 is shown on oscilloscope 9 shown on FIG. 8(*c*). In FIG. 8(*c*), the lower curve is the modulation voltage signal; the vertical coordinate is 10 volt/div., and 100 msec/div. The upper curve shows the output intensity measured; the vertical coordinate is 50 μvolt/grid, and 100 msec/div., The results are as listed in Table 1 and 2.

EXAMPLE 2

Figure 9:
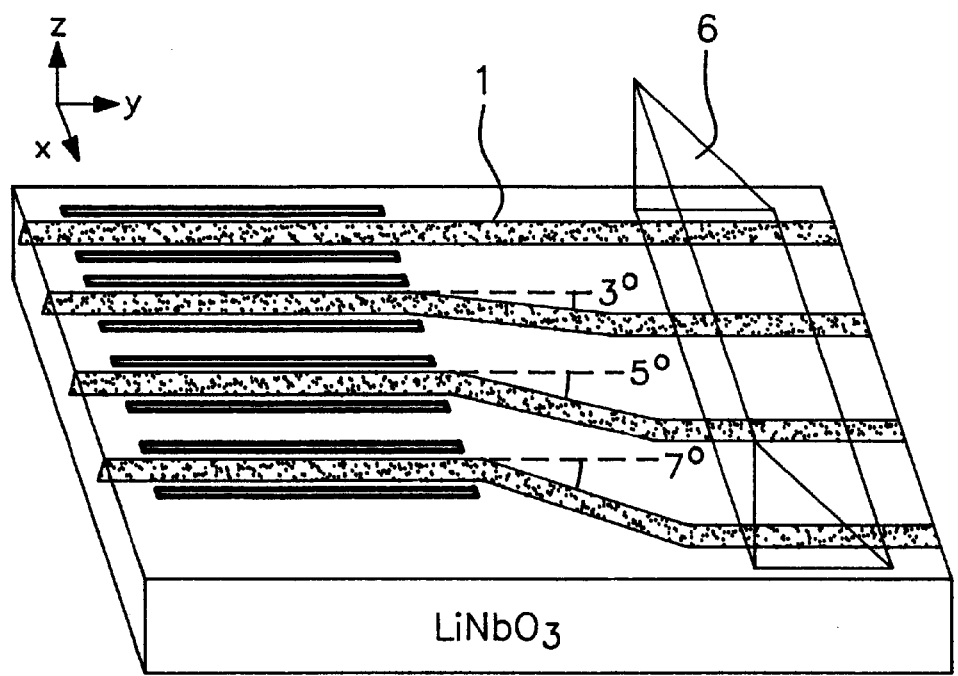
FIG. 9 measuring method for multi-mode waveguide.

In measuring multi-mode waveguide, the curve loss of each mode can be measured by the method as shown in FIG. 9. Firstly, fabricate a long straight waveguide and curve waveguides with bending angle θ, the method as used in Example 1 can be used to derive each mode's propagation loss $\alpha_{ewm}$ (pertaining to mth mode). Use the same measurement method format as for a long straight waveguide, the propagation loss $\alpha_{ewm\theta}$ (pertaining to mth mode) of waveguide with bending angle θ can be derived. Therefore, the curve loss $I_{m\theta}$ of the mth mode can be expressed as:

$$I_{m\theta} = I_{im}\exp(-\alpha_{ewm}L_\theta) - I_{im}\exp(-\alpha_{ewm\theta}L_\theta) \quad (13)$$

In which, L$_\theta$ indicate the length of the waveguide with bending angle θ. Consequently, the curve loss for the mth mode with dB as unit can be expressed as $$10\log(I_{m\theta}/I_{im}) = 10\log[\exp(-\alpha_{ewm}L_\theta) - \exp(-\alpha_{ewm\theta}L_\theta)] \quad (14)$$

The $\alpha_{ewm}$ and $\alpha_{ewm\theta}$ derived from the above can be used for obtaining the waveguide's bending loss of the mth mode.

Through the ion exchange method as used in Example 1, long waveguide can be fabricated on the Z-cut LiNbO$_3$ substrate along with waveguides of θ=3°, 5°, 7°. From Example 1, it can be shown that for TM mode and such waveguides, they exhibit tree modes of TM1, TM2, TM3. Through the method as cited in FIG. 7, the bending loss results can be obtained as shown in Table 3.

Although the waveguides fabricated through ion exchange method on LiNbO$_3$ substrate mentioned above is for describing the details of measuring the propagation loss and bending loss of each mode through the method claimed hereon, the field professionals familiar with the technology would understand that without deviating from the characteristics and scope of the creation, the new method can be applied to produce long straight waveguides and various bending waveguides on various substrates through different fabrication methods.

TABLE 1

Edge Coupled Results

|  | No Prism Couple | With Prism Couple |
|---|---|---|
| Contrast C | 0.231 | 0.173 |
| Propagation Loss dB/cm | $\alpha_{ew}$ = 0.417 | $\alpha_{ep}$ = 1.055 |
| Propagation Loss cm$^{-1}$ | 0.097 | 0.245 |
| Prism Couple Efficacy | 0.210 | |

TABLE 2

Prism Coupled Results

|  | TM1 | TM2 | TM3 |
|---|---|---|---|
| Contrast C | 0.187 | 0.170 | 0.160 |
| $\alpha_{epm}$ dB/cm | 0.970 | 1.088 | 1.217 |
| $\alpha_{epm}$ cm$^{-1}$ | 0.226 | 0.253 | 0.283 |
| Propagation Loss (dB/cm) | 0.335 | 0.423 | 0.516 |

TABLE 3

Mode Bending Loss

| Mode/θ | 3° | 5° | 7° |
|---|---|---|---|
| TM1 | 1.5 dB | 4.0 dB | 7.0 dB |
| TM2 | 1.7 dB | 4.3 dB | 7.4 dB |
| TM3 | 1.9 dB | 4.7 dB | 7.8 dB |

What is claimed is:

1. A resultant device for measuring propagation loss and ending loss of individual nodes for single mode and multi-mode waveguides, said resultant device comprising:

means for constructing a Fabry-Perot etalon by tuning an effective length of waveguide using an electrooptical effect;

means for coupling an optical light from an optical source into a waveguide;

means for measuring a contrast of an output optical light from the waveguide using a butt couple method;

means for distinguishing an output optical light by using a prism couple method on each individual mode;

means for measuring the contrast of the distinguished individual mode;

means for obtaining by comparing the measured contrasts of the propagation loss and bending loss for the distinguished individual mode.

2. The resultant device as recited in claim 1, wherein the waveguide configuration includes straight waveguides, bending waveguides with various bending angles, and the electrooptical components built with straight waveguides and various bending waveguides.

3. The resultant device as recited in claim 1, wherein the substrate used for fabrication of waveguides includes semiconductor, glass, $LiNbO_3$, organic sustrate, and nonlinear crystals.

4. The resultant device as recited in claim 1, wherein the fabrication of the waveguides includes deposition, plating thermal diffusion, ion exchange, ion implantation, chemical wet etching, and dry etching methods.

5. The resultant device as recited in claim 1, wherein optical source includes all the light source with various wavelengths which can be coupled into the measured waveguides.

6. A nondestructive method for measuring propagation loss and ending loss of each individual node for single mode and multimode waveguides, said method comprising the steps of:

constructing a Fabry-Perot etalon by tuning an effective length of a waveguide using an electrooptical effect;

coupling an optical light from an optical source into said waveguide;

measuring a contrast of an output of optical light from the waveguide using a butt couple method;

using a prism couple method to distinguish an output optical light of each individual mode;

measuring the contrast of the distinguished individual mode;

comparing the measured contrasts; and obtaining the distinguished individual mode's propagation loss and bending loss.

7. The nondestructive method as recited in claim 6, wherein said waveguide configuration includes straight waveguides, bending waveguides with various bending angles, and the electrooptical components built with straight waveguides and various bending waveguides.

8. The method as recited in claim 6, wherein the substrate used for fabrication of waveguides includes semiconductor, glass, $LiNbO_3$, organic sustrate, and nonlinear crystals.

9. The nondestructive method as recited in claim 6, wherein the fabrication method of waveguides includes deposition, plating thermal diffusion, ion exchange, ion implantation, chemical wet etching, and dry etching methods.

10. The nondestructive method as recited in claim 6, wherein the optical source includes all the light source with various wavelengths which can be coupled into the measured waveguides.

* * * * *